US008847559B1

(12) United States Patent
Horne

(10) Patent No.: US 8,847,559 B1
(45) Date of Patent: Sep. 30, 2014

(54) GENERATOR SYSTEM AND METHOD OF OPERATION

(71) Applicant: Robert Ryan Jameson Horne, Lindsay (CA)

(72) Inventor: Robert Ryan Jameson Horne, Lindsay (CA)

( * ) Notice: Subject to any disclaimer, the term of this patent is extended or adjusted under 35 U.S.C. 154(b) by 0 days.

(21) Appl. No.: 14/198,785

(22) Filed: Mar. 6, 2014

Related U.S. Application Data

(60) Provisional application No. 61/857,854, filed on Jul. 24, 2013.

(51) Int. Cl.
H02P 11/00 (2006.01)

(52) U.S. Cl.
USPC ............................................. 322/25; 307/105

(58) Field of Classification Search
USPC .................................. 322/22, 20, 25; 307/105
See application file for complete search history.

(56) References Cited

U.S. PATENT DOCUMENTS

| | | | | |
|---|---|---|---|---|
| 4,532,465 | A * | 7/1985 | Renard | 318/814 |
| 5,406,190 | A * | 4/1995 | Rosenberg | 322/32 |
| 5,949,190 | A | 9/1999 | Notsu | |
| 6,465,979 | B1 * | 10/2002 | Leijon et al. | 318/438 |
| 7,042,110 | B2 * | 5/2006 | Mikhail et al. | 290/44 |
| 7,053,590 | B2 * | 5/2006 | Wang | 322/24 |
| 7,439,714 | B2 * | 10/2008 | Llorente Gonzalez et al. | 322/24 |
| 7,576,443 | B2 | 8/2009 | Raju | |
| 8,106,540 | B2 * | 1/2012 | Larsen et al. | 307/105 |
| 8,228,645 | B2 * | 7/2012 | English et al. | 361/15 |
| 8,643,215 | B2 * | 2/2014 | Schweitzer, III | 307/64 |
| 2003/0222459 | A1 * | 12/2003 | Harris et al. | 290/28 |
| 2006/0043940 | A1 | 3/2006 | Wang | |
| 2006/0214643 | A1 | 9/2006 | Angquist et al. | |
| 2010/0253094 | A1 | 10/2010 | Russberg et al. | |
| 2011/0187105 | A1 | 8/2011 | Minami et al. | |

OTHER PUBLICATIONS

Rene Wamkeue, Nahi Kandil, Jacques East, Yes Boisclair. Apr. 9-11, 2003 "Series Compensation for a Hydro-Quebec Long Distribution Line." ICREPQ'03 International Conference on Renewable Energies and Power Quality, Vigo, Espagne.*

* cited by examiner

Primary Examiner — Nicholas Ponomarenko
(74) Attorney, Agent, or Firm — Gilbert's LLP; Matthew D. Powell

(57) ABSTRACT

A generator system includes an AC generator having one or more phases, a transformer having the same number of phases as the generator, and for each phase of the AC generator, a capacitive element having a first terminal electrically connected to an output winding of the AC generator and a second terminal electrically connected to a primary winding of a respective phase of the transformer. A method of operating a generator system includes conveying current between an output winding of each phase of an AC generator and a primary winding of a respective phase of a transformer via a respective series-connected capacitive element having a first terminal electrically connected to the output winding and a second terminal electrically connected to the primary winding.

11 Claims, 2 Drawing Sheets

| TEST No. | SYS CONFIG | GEN TYPE | GEN PH | RTR EXC | RTR DCV | RTR DCA | RTR W | RTR mH | RTR Ω | RTR RPM | TRQ lb-ft | POLE No. | STTR μH | STTR Ω | XFMR TYPE | PRI μH | PRI μΩ | SEC mH | SEC Ω | CAP μF | CAP No. | GEN ACV | GEN ACA | GEN VA | GEN Hz | SEC ACV |
|---|---|---|---|---|---|---|---|---|---|---|---|---|---|---|---|---|---|---|---|---|---|---|---|---|---|
| 1 | FIG. 1 | SYNC | TPH | DC | 6.3 | 2.786 | 17.63 | 11.93 | 2.3 | 491 | 3.56 | 12 | 210.6 | 1.56 | CT | 15 | 250 | 290 | 18.9 | N/A | 0 | 3.421 | 6.718 | 39.81 | 49.14 | 2.430 |
| 2 | FIG. 1 | SYNC | TPH | DC | 6.2 | 2.643 | 16.38 | 11.93 | 2.3 | 2305 | 0.76 | 12 | 210.6 | 1.56 | CT | 15 | 250 | 290 | 18.9 | 330 | 3 | 20.79 | 4.921 | 177.2 | 230.5 | 9.91 |
| 3 | FIG. 1 | SYNC | TPH | DC | 6.1 | 2.728 | 16.64 | 11.93 | 2.3 | 2206 | 0.79 | 12 | 210.6 | 1.56 | CT | 15 | 250 | 290 | 18.9 | 470 | 3 | 20.66 | 6.473 | 231.6 | 220.6 | 10.98 |
| 4 | FIG. 1 | SYNC | TPH | DC | 6.0 | 2.709 | 16.25 | 11.93 | 2.3 | 2109 | 0.83 | 12 | 210.6 | 1.56 | CT | 15 | 250 | 290 | 18.9 | 1000 | 3 | 16.53 | 10.56 | 302.3 | 210.9 | 12.12 |
| 5 | FIG. 1 | SYNC | TPH | DC | 6.1 | 2.647 | 16.15 | 11.93 | 2.3 | 1596 | 1.09 | 12 | 210.6 | 1.56 | CT | 15 | 250 | 290 | 18.9 | 2200 | 3 | 13.02 | 12.79 | 288.4 | 159.6 | 9.69 |
| 6 | FIG. 1 | SYNC | TPH | DC | 6.4 | 2.636 | 16.87 | 11.93 | 2.3 | 1196 | 1.46 | 12 | 210.6 | 1.56 | CT | 15 | 250 | 290 | 18.9 | 4700 | 3 | 9.44 | 11.93 | 195.1 | 119.6 | 7.08 |
| 7 | FIG. 1 | SYNC | TPH | DC | 6.4 | 2.591 | 16.58 | 11.93 | 2.3 | 644 | 2.72 | 12 | 210.6 | 1.56 | CT | 15 | 250 | 290 | 18.9 | 10 000 | 3 | 5.80 | 7.432 | 74.66 | 64.4 | 3.164 |

| TEST No. | SYS CONFIG | GEN TYPE | GEN PH | RTR EXC | RTR DCV | RTR DCA | RTR W | RTR mH | RTR Ω | RTR RPM | TRQ lb-ft | POLE No. | STTR μH | STTR Ω | XFMR TYPE | PRI μH | PRI μΩ | SEC mH | SEC Ω | CAP μF | CAP No. | GEN ACV | GEN ACA | GEN VA | GEN Hz | SEC ACV |
|---|---|---|---|---|---|---|---|---|---|---|---|---|---|---|---|---|---|---|---|---|---|---|---|---|---|
| 8 | FIG. 1 | SYNC | TPH | STAT | 8.2 | 3.9 | 31.98 | 11.93 | 2.3 | 333 | 3.94 | 12 | 210.6 | 1.56 | CT | 15 | 250 | 290 | 18.9 | N/A | 0 | 2.274 | 11.71 | 46.12 | 33.3 | 2.29 |
| 9 | FIG. 1 | SYNC | TPH | STAT | 13 | 5.965 | 77.54 | 11.93 | 2.3 | 1009 | 1.30 | 12 | 210.6 | 1.56 | CT | 15 | 250 | 290 | 18.9 | 330 | 3 | 11.64 | 6.320 | 127.4 | 100.9 | 3.6 |
| 10 | FIG. 1 | SYNC | TPH | STAT | 11.6 | 5.29 | 61.52 | 11.93 | 2.3 | 1001 | 1.31 | 12 | 210.6 | 1.56 | CT | 15 | 250 | 290 | 18.9 | 470 | 3 | 11.51 | 6.554 | 130.6 | 100.1 | 5.15 |
| 11 | FIG. 1 | SYNC | TPH | STAT | 10.8 | 4.864 | 52.53 | 11.93 | 2.3 | 991 | 1.32 | 12 | 210.6 | 1.56 | CT | 15 | 250 | 290 | 18.9 | 1000 | 3 | 11.27 | 7.873 | 153.7 | 99.1 | 6.6 |
| 12 | FIG. 1 | SYNC | TPH | STAT | 9.8 | 4.369 | 42.81 | 11.93 | 2.3 | 913 | 1.43 | 12 | 210.6 | 1.56 | CT | 15 | 250 | 290 | 18.9 | 2200 | 3 | 10.2 | 9.495 | 167.7 | 91.3 | 5.39 |
| 13 | FIG. 1 | SYNC | TPH | STAT | 7.7 | 3.247 | 25 | 11.93 | 2.3 | 774 | 1.69 | 12 | 210.6 | 1.56 | CT | 15 | 250 | 290 | 18.9 | 4700 | 3 | 7.92 | 10.852 | 148.9 | 77.4 | 4.48 |
| 14 | FIG. 1 | SYNC | TPH | STAT | 5.1 | 2.033 | 10.36 | 11.93 | 2.3 | 747 | 1.75 | 12 | 210.6 | 1.56 | CT | 15 | 250 | 290 | 18.9 | 10 000 | 3 | 5.54 | 12.259 | 117.6 | 74.7 | 4.34 |

| TEST No. | SYS CONFIG | GEN TYPE | GEN PH | SYNC RPM | RTR RPM | TRQ lb-ft | POLE No. | STTR mH | STTR Ω | XFMR TYPE | PRI mH | PRI Ω | CAP μF | CAP No. | GRID ACV | GRID ACA | GRID VA | GRID Hz | GEN ACV | GEN ACA | GEN VA | GEN PF | GEN W | GEN VAR | GEN Hz |
|---|---|---|---|---|---|---|---|---|---|---|---|---|---|---|---|---|---|---|---|---|---|---|---|---|---|
| 15 | FIG. 1 | IND | SPH | 1800 | 2247 | 0.58 | 4 | 4.132 | 4.8 | PWR | 3.731 | 3.9 | N/A | 0 | 121.4 | 0.462 | 56.08 | 60 | 11.21 | 2.336 | 26.186 | 0.87 | 22.78 | 3.406 | 60 |
| 16 | FIG. 1 | IND | SPH | 1800 | 1852 | 0.71 | 4 | 4.132 | 4.8 | PWR | 3.731 | 3.9 | 100 | 1 | 121.9 | 0.164 | 19.99 | 60 | 5.27 | 0.798 | 4.205 | 0.23 | 0.967 | 3.237 | 60 |
| 17 | FIG. 1 | IND | SPH | 1800 | 1940 | 0.67 | 4 | 4.132 | 4.8 | PWR | 3.731 | 3.9 | 220 | 1 | 122.2 | 0.173 | 21.14 | 60 | 6.92 | 1.239 | 8.5738 | 0.47 | 4.029 | 4.544 | 60 |
| 18 | FIG. 1 | IND | SPH | 1800 | 1992 | 0.65 | 4 | 4.132 | 4.8 | PWR | 3.731 | 3.9 | 330 | 1 | 121.4 | 0.238 | 28.89 | 60 | 9.17 | 1.844 | 16.909 | 0.65 | 10.99 | 5.918 | 60 |
| 19 | FIG. 1 | IND | SPH | 1800 | 1800 | 0 | 4 | 4.132 | 4.8 | PWR | 3.731 | 3.9 | 470 | 1 | 120.6 | 0.333 | 40.159 | 60 | 11.04 | 2.355 | 25.999 | 0.83 | 21.57 | 4.419 | 60 |
| 20 | FIG. 1 | IND | SPH | 1800 | 1800 | 0 | 4 | 4.132 | 4.8 | PWR | 3.731 | 3.9 | 680 | 1 | 120.7 | 0.432 | 52.142 | 60 | 12.96 | 2.788 | 36.132 | 0.97 | 35.04 | 1.083 | 60 |
| 21 | FIG. 1 | IND | SPH | 1800 | 1800 | 0 | 4 | 4.132 | 4.8 | PWR | 3.731 | 3.9 | N/A | 0 | 115.4 | 0.360 | 41.544 | 60 | 13.40 | 1.364 | 18.277 | 0.55 | 10.05 | 8.224 | 60 |
| 22 | FIG. 1 | IND | SPH | 1800 | 1800 | 0 | 4 | 4.132 | 4.8 | PWR | 3.731 | 3.9 | 100 | 1 | 116.2 | 0.640 | 74.368 | 60 | 112.1 | 5.463 | 612.40 | 0.27 | 165.3 | 447.1 | 60 |
| 23 | FIG. 1 | IND | SPH | 1800 | 1800 | 0 | 4 | 4.132 | 4.8 | PWR | 3.731 | 3.9 | 220 | 1 | 120.9 | 0.534 | 64.561 | 60 | 67.9 | 4.060 | 275.67 | 0.63 | 173.6 | 101.9 | 60 |
| 24 | FIG. 1 | IND | SPH | 1800 | 1800 | 0 | 4 | 4.132 | 4.8 | PWR | 3.731 | 3.9 | 330 | 1 | 121.6 | 0.963 | 117.10 | 60 | 54.5 | 4.614 | 251.46 | 0.85 | 213.7 | 37.71 | 60 |
| 25 | FIG. 1 | IND | SPH | 1800 | 2032 | 0.64 | 4 | 4.132 | 4.8 | PWR | 3.731 | 3.9 | 470 | 1 | 120.6 | 0.720 | 86.832 | 60 | 38.9 | 3.544 | 137.86 | 0.98 | 135.1 | 2.757 | 60 |
| 26 | FIG. 1 | IND | SPH | 1800 | 2168 | 0.60 | 4 | 4.132 | 4.8 | PWR | 3.731 | 3.9 | 680 | 1 | 120.2 | 0.711 | 85.462 | 60 | 30.49 | 4.320 | 131.71 | 0.83 | 109.3 | 22.39 | 60 |

FIG. 2

GENERATOR SYSTEM AND METHOD OF OPERATION

CROSS-REFERENCE TO RELATED APPLICATION

This application claims priority under 35 U.S.C. 119(e) from U.S. Provisional Patent Application Ser. No. 61/857,854 filed on Jul. 24, 2013.

FIELD OF THE INVENTION

The following relates generally to generation of electrical power and in particular to a generator system and method of operation of a generator system.

BACKGROUND OF THE INVENTION

Generator systems for generating and conditioning electrical power using electrical AC (alternating current) generators for use in powering electrical devices and systems are well known.

For example, U.S. Pat. No. 5,406,190 to Rosenberg discloses a device for generating electrical energy includes at least one AC generator which is coupled to a turbine driven by a flowing medium and is connected via capacitive elements to a rectifier with impressed output voltage. The capacitive elements are rated or are able to be controlled in relationship to the inductances existing in the generator electric circuit in a way that allows the resonant frequency of the oscillating circuit made up of the capacitive elements and the inductors to lie above the highest frequency that occurs under field conditions.

United States Patent Application Publication No. 2006/0043940 to Wang discloses a power generating system includes a high-frequency alternator, a rectifier, a capacitor in each phase line extending between an output terminal of the alternator and the rectifier, and an auxiliary power supply, providing auxiliary power for use within the power generating system, which is also connected to the output terminals of the alternator.

United States Patent Application Publication No. 2003/0222459 to Harris et al. discloses an electrical generating system comprising an AC electrical generator having an output, and a capacitor arrangement provided at the output of the generator and arranged so as to offset a drop of voltage from no-load to full-load occurring at the output of the generator. The generator is a permanent-magnet generator having a plurality of terminals and associated output lines, and the capacitor arrangement comprises a respective capacitor connected in series in each of the output lines, with the value of the capacitance of each capacitor being selected such that a drop of voltage from no-load to full-load occurring at the associated generator terminal is substantially offset at an output terminal of each said capacitor.

United States Patent Application Publication No. 2011/0187105 to Minami et al. discloses a maintenance operation method for a wind turbine generator and a wind turbine generator, which can effectively utilize a phase advance capacitor equipped in the wind turbine generator and contribute to the phase factor improvement of the system side. A maintenance operation method is provided for a wind turbine generator that includes an induction generator driven by rotation of blades, a power output line for outputting power of the induction generator to a distribution system, and at least one phase advance capacitor parallel-connected to the power output line. The method includes a first step of releasing connection between the phase advanced capacitor and the power output line when a maintenance mode is selected, and a second step of returning the connection between the phase advanced capacitor and the power output line by a manual operation or an automatic operation, wherein the phase advance capacitor returned to the connection with the power output line performs a power factor improvement of reactor loads in the distribution system side through a linkage portion with the distribution system.

United States Patent Application Publication No. 2006/0214643 to Angquist et al. discloses an electric network for generation and transmission of electric power, including a power generating part, a point of common connection for the power generating part, a transmission link, a load network, and a reactive power compensator. The transmission link is coupled between the point of common connection and a grid connection point at the load network. The reactive power compensator is coupled to transmission link. The power generating part includes at least one wind turbine with an electric generator of induction type, coupled to the point of common connection. The reactive power compensator includes a capacitor bank and in parallel coupling to the capacitor bank a controllable inductor having a magnetic core, a main winding for alternating current, and a DC-control winding for direct current. The DC-control winding for control of the magnetic flux is set up by the main winding via orthogonal magnetization of the core.

U.S. Pat. No. 7,576,443 to Raju discloses a method of generating electric power includes providing at least one open-winding generator having at least one winding, wherein the at least one winding has a first terminal and a second terminal. The method also includes electrically coupling the first terminal to a first electric power electronics apparatus via a first electric bus and electrically coupling the second electric terminal to a second electric power electronics apparatus via a second electric bus. The method further includes inducing and regulating a first voltage on the first electric bus and inducing and regulating a second voltage on the second electric bus.

While various generator systems are known, improvements are of course desirable.

SUMMARY OF THE INVENTION

According to an aspect there is provided a generator system comprising an AC generator having one or more phases; a transformer having the same number of phases as the generator; and for each phase of the AC generator, a capacitive element having a first terminal electrically connected to an output winding of the AC generator and a second terminal electrically connected to a primary winding of a respective phase of the transformer.

According to another aspect, there is provided a method of operating a generator system, the method comprising conveying current between an output winding of each phase of an AC generator and a primary winding of a respective phase of a transformer via a respective series-connected capacitive element having a first terminal electrically connected to the output winding and a second terminal electrically connected to the primary winding.

According to another aspect, there is provided a generator system comprising an AC generator selected from one of a single phase generator and a poly phase generator; at least one capacitive element, wherein the number of capacitive elements being selected depending on the number of phases of the AC generator; and a transformer selected from one of a single-phase transformer and a poly phase transformer, the transformer being selected depending on the number of phases of the AC generator; wherein the at least one capacitive element has/have a first terminal electrically connected to a stator winding of the AC generator and has/have a second terminal electrically connected to a primary winding of the transformer.

Other aspects and various advantages are disclosed herein.

BRIEF DESCRIPTION OF THE DRAWINGS

Embodiments will now be described with reference to the appended drawing in which:

FIG. 2 is a set of tables of operating parameters and measurements taken during several tests of AC generator systems.

DETAILED DESCRIPTION

Figure 1:
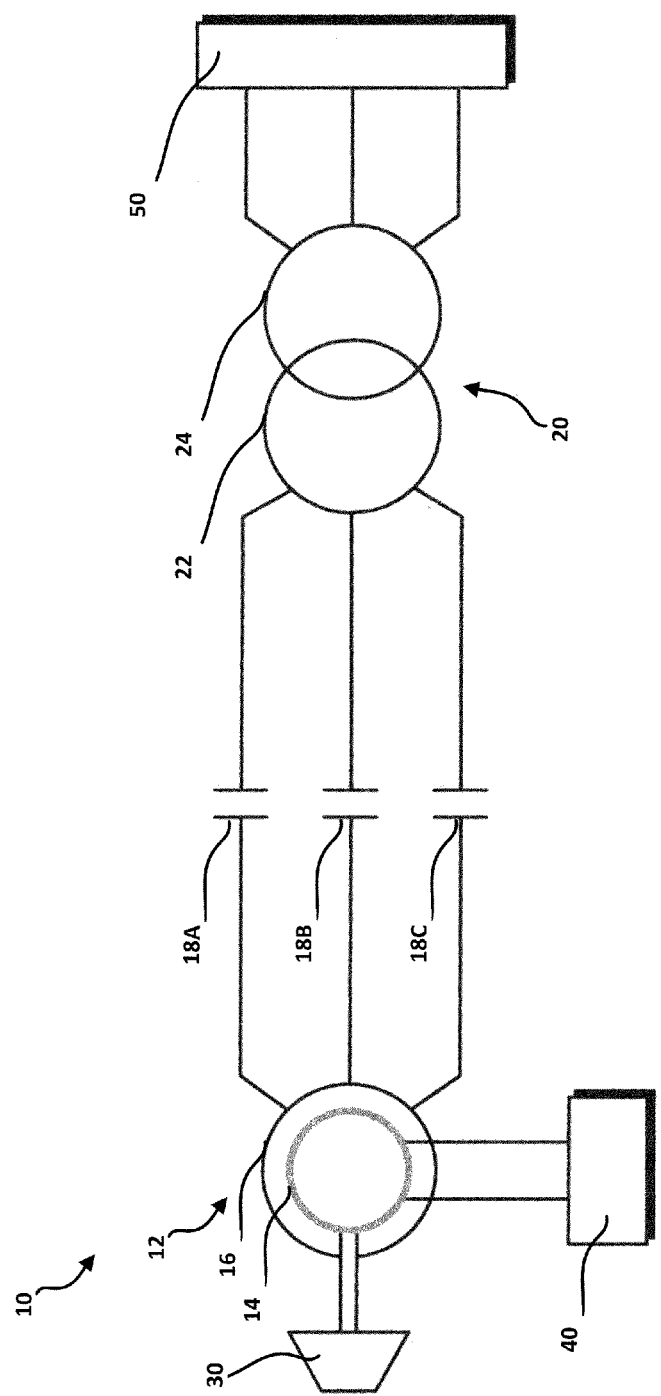
FIG. 1 is a schematic illustration of a three phase AC generator system in accordance with an embodiment.

Disclosed herein is a generator system. According to embodiments, the generator system includes an AC generator having one or more phases, a transformer having the same number of phases as the generator, and for each phase of the AC generator, a capacitive element connected in series between an output winding of the AC generator and a primary winding of a respective phase of the transformer.

FIG. 1 is a schematic illustration of an embodiment of a three-phase generator system 10 according to an embodiment. Generator system 10 is shown associated with a turbine 30, an excitation supply 40, and a three-phase electrical grid 50.

In this embodiment, generator system 10 includes a three-phase synchronous AC generator 12, capacitive elements 18A, 18B and 18C (a capacitive element for each phase), and a three-phase transformer 20.

In this embodiment, three-phase generator 12 includes a rotor 14 that can be caused to rotate with respect to a stator 16, thereby to produce in each of three windings of the stator 16 an alternating current (AC), in a known manner. In this embodiment, therefore, the stator windings are output windings. Rotor 14 may be caused to rotate via turbine 30 to generate current in the output windings with the support of direct current (DC) excitation supply 40 in a known manner. For example, turbine 30 may be associated with a steam turbine, a gas power motor, or some other source of rotational mechanical force.

The excitation supply 40 may be an external DC exciter where the DC generator is coupled to the same shaft as the AC generator 12. Alternatively, the excitation supply 40 may provide static excitation, where power is supplied from the stator winding through field coils to supply power to rectifiers to provide DC power to the generator rotor winding. The excitation supply 40 may alternatively be derived from permanent magnets mounted on the stator/rotor of the AC generator 12 to provide excitation. The AC generator 12 may alternatively be excited using brushless excitation such as is employed in induction generators, where a rotating field in the stator induces a current in the rotor through electromagnetic induction.

In this embodiment, each of the capacitive elements 18A-C is a single-phase capacitor having two terminals. Capacitors 18A-C may be non-polarized or polarized, and may be constructed of any suitable dielectric material. Oil-filled film-based capacitors are preferable for high-voltage and high-amperage operating conditions due to their higher stability and wear resistance as compared to some alternatives, along with their useful self-healing technology. It is generally preferred that the capacitive elements 18A-C have a very low Equivalent Series Resistance (ESR), so as to preserve current-carrying capability under such operating conditions, and also to produce less heat.

As shown in FIG. 1, each of capacitive elements 18A-C has a first terminal electrically connected to a respective output winding of the AC generator 12, and a second terminal electrically connected to a respective primary winding of the transformer. For each phase of the generator system 10, AC current is conveyed between the output winding and a primary winding 22 of a respective phase of transformer 20 via a respective series-connected capacitive element 18A, 18B or 18C.

Secondary windings 24 of transformer 20 are, in turn, electrically connected to an electrical grid for distribution.

For generator system 10 to operate at a high efficiency, the capacitance of each capacitive element 18A-C is selected to provide, along with the inductance of the stator/rotor winding of the generator and the primary winding of the transformer, an LC circuit arrangement that resonates at a constant operating frequency of the AC generator 12. The inductance used in the calculation to determine the value of capacitance for the LC resonant circuit is the total closed-loop inductance of the stator/rotor winding of the generator and the primary winding of the transformer per phase, as shown in Equation 1 below:

$$C = \frac{1}{L(2\pi f)^2} \qquad (1)$$

where:

C is capacitance in Farads;

L is the combined inductance in Henries of the output and primary windings; and f is the operating frequency of the AC generator in Hertz, which may be expressed as $\omega/2\pi$, where $\omega$ is the angular frequency of the rotor in radians/second.

In an alternative embodiment, the capacitance of the capacitive elements may be selected to establish a higher resonant frequency than the operating frequency of the generator. Preferably the AC generator 12 and transformer 20 are selected such that the inductance of the stator/rotor winding of the generator is higher than the inductance of the primary winding of the transformer. Furthermore, the current output from the AC generator should be high enough to keep the capacitors charged to full voltage during each half cycle of the AC sine wave.

During operation of the generator system 10 described above, the capacitive elements of two of the three phases are in series with each other at any given time. For example, during one portion of a cycle capacitive element 18A will be in series with capacitive element 18B. During another portion of the cycle capacitive element 18A will be in series with capacitive element 18C, and during another portion of the cycle capacitive element 18B will be in series with capacitive element 18C. Because of these resultant series arrangements, each of the capacitive elements 18A-C should have a capacitance that is twice the capacitance calculated as above so as to provide the suitable effective capacitance. It will be understood that in a single-phase generator system no such series arrangement will occur during a cycle and, as such, the single capacitive element in the single-phase system should have a capacitance that matches the capacitance calculated as above.

Preferably, components are chosen to achieve a high quality factor between the inductive and capacitive element of the system. A higher quality factor results in an increase in efficiency over a lower quality factor, and a higher quality factor may be achieved if the combined inductance value of the stator/rotor winding of the generator and the primary winding of the transformer is higher than the capacitance of the capacitive element. Additionally, selection of components to provide a low circuit resistance overall can assist with achieving high quality factor.

Switches may be inserted into the system to redirect the path of electricity if needed in order to maintain, replace or deactivate the capacitors. These switches may be electrical, mechanical or a combination of both.

The generator systems disclosed herein may be employed with wind turbines, household portable generators, large scale portable generators, mini power plant designs such as mini hydro plants and biomass plants. Furthermore, the generator systems disclosed herein may be incorporated into large power plants such as fossil fuel powered plants, large hydro station plants and nuclear power plants. Still further, the generator systems disclosed herein may be incorporated in electric/hybrid vehicles to generate electricity for charging batteries.

When DC power is required from the generator system a rectifier may be electrically connected to the secondary winding of the transformer 20 prior to further distribution and/or use. As would be understood, a rectifier functions to convert the AC power from the transformer to DC power, which may be suitable for charging batteries or to power an inverter to provide mains frequency AC power to the grid or load.

In the embodiments described herein, a capacitive element is connected in series between an output winding of an AC generator and the primary winding of a transformer.

With a capacitive element connected in series between the output winding of the AC generator and the primary winding of the transformer, the capacitive reactance and inductive reactance of the system (if tuned to the operating frequency of the generator) cancel each other out and leave only pure resistance to impede the flow of current. As a result the current output increases, which in turn increases the power output of the system.

When compared to an equivalent generator system without such capacitive elements connected in series in this way, less mechanical energy needs to be consumed in order to generate the same amount of electrical energy, enabling lower fuel consumption and lower emissions. Similarly, the same amount of mechanical energy generates more electrical energy. That is, an increase in efficiency of the generator system is provided.

In an alternative embodiment, the AC generator may be another type of AC generator such as an induction generator and/or may have a different number of phases, such as one phase. Where AC generator has only one phase, the transformer used will require only one phase and only one capacitive element series-connected between the stator and primary windings would be used.

In another alternative embodiment, the AC generator may be a permanent magnet generator having a rotor winding carrying AC power, and with capacitive elements for each phase being electrically connected to a respective rotor winding as opposed to a respective stator winding.

As an alternative to the capacitive elements each being a single capacitor, capacitive elements may each be a bank of two series-connected capacitors, or alternatively a different bank configuration of capacitors arranged to reach the proper value of capacitance with the appropriate voltage and amperage rating to withstand the levels being dealt with by generator system 10. While it is possible that all capacitive elements in an implemented poly phase generator system are identically constructed, for example by each having an identical capacitor as described above, this is not required provided that the overall capacitance and power-handling of each capacitive element is suitable.

Testing

FIG. 2 is a set of tables of operating parameters and measurements taken during several tests of AC generator systems. The abbreviated table headings are set forth in more detail in Table 1 below:

TABLE 1

| Heading | Detail | Heading | Detail |
|---|---|---|---|
| SYS | System | SEC | Secondary |
| GEN | Generator | CAP | Capacitor |
| PH | Phase | µF | Micro-Farad |
| RTR | Rotor | ACV | AC Voltage |
| EXC | Excitation | ACA | AC Amperage |
| DCV | DC Voltage | VA | Volt-Ampere |
| DCA | DC Amperage | Hz | Hertz |
| W | Watt | TPH | Three-phase |
| mH | Milli-Henry | CT | Current Transformer |
| Ω | Ohm | SYNC | Synchronous |
| RPM | Revolutions Per Minute | PF | Power Factor |
| TRQ | Torque | VAR | Volt-Ampere Reactive |
| STTR | Stator | CONFIG | Configuration |
| µH | Micro-Henry | SPH | Single phase |
| XFMR | Transformer | IND | Induction |
| PRI | Primary | PWR | Power |
| lb-ft | Pound foot | µΩ | Micro-Ohm |

Tests 1 through 7 were conducted with a three phase synchronous AC generator coupled to a three phase transformer. The synchronous generator was excited by an external DC power source. Test 1 was conducted without any capacitors coupled between the stator winding of the generator and the primary winding of the transformer, as a baseline for comparisons to gauge differences in electrical power output of the AC generator and the amount of mechanical energy consumed by the AC generator. Test 1 revealed that the generator system without the series-connected capacitive elements operates at a low efficiency: the AC generator consumes a high amount of mechanical energy to produce a low amount of electrical energy.

Tests 2 through 7 were conducted with configurations described herein whereby capacitive elements having various capacitances were connected in series between the stator winding of the generator and the primary winding of the transformer. These tests illustrated that electrical power output can increase with the capacitive elements connected, along with a decrease in consumption of mechanical power by the AC generator. Of tests 2 through 7, test 4 revealed the highest efficiencies: the mechanical energy consumed by the AC generator was reduced by 430% as compared to the configuration for baseline test 1, while the output electrical energy increased to its highest value.

Tests 8 through 14 were also conducted with a three phase synchronous generator coupled to a three phase transformer. In these tests, a synchronous generator was excited by static excitation whereby the rotor was coupled to the stator winding through a rectifier unit. Test 8 was conducted without any capacitors coupled between the stator winding of the generator and the primary winding of the transformer, as a baseline for comparisons to gauge differences in electrical power output of the AC generator and the amount of mechanical energy consumed by the AC generator. Test 8 revealed that the generator system without the series-connected capacitive elements operates at a low efficiency; the AC generator consumers a high amount of mechanical energy to produce a low amount of electrical energy.

Test 9 through 14 were conducted with configurations described herein whereby capacitive elements having various capacitances were connected in series between the stator winding of the generator and the primary winding of the transformer. These tests also illustrated that electrical power output can increase with the capacitive elements connected, along with a decrease in consumption of mechanical power by the AC generator.

Tests 15 through 26 were conducted with a single-phase induction AC generator coupled to a single phase transformer. The transformer was in turn connected to a household electrical grid. Tests 15 and 21 were conducted without any capacitive elements coupled in series between the AC generator and the transformer. Test 15 was conducted at zero revolutions per minute of the rotor of the AC generator, and test 21 was conducted at 2247 revolutions per minute of the rotor. Furthermore, tests 16 through 20 and 22 through 26 were conducted with different capacitance values of the capacitive elements being electrically coupled in series between the AC generator and the transformer. Test 16 through 20 was conducted at zero revolutions per minute and tests 22 through 26 were conducted during full RPM. These tests were conducted to gauge how the capacitance can affect the electrical power output from the generator and the mechanical energy consumed from the generator. The tests revealed that an induction generator will produce more electrical power output with a capacitive element coupled in series between the stator winding of the generator and the primary winding of the transformer, but the input mechanical energy does not decrease as with a synchronous generator.

Although embodiments have been described with reference to the drawings, those of skill in the art will appreciate that variations and modifications may be made without departing from the spirit and scope thereof as defined by the appended claims.

What is claimed is:

1. A generator system comprising:
    an AC generator having one or more phases;
    a transformer having the same number of phases as the generator; and
    for each phase of the AC generator, a capacitive element having a first terminal electrically connected to an output winding of the AC generator and a second terminal electrically connected to a primary winding of a respective phase of the transformer.

2. The generator system of claim 1, wherein the capacitance of each capacitive element causes the generator system to resonate at an operating frequency of the AC generator.

3. The generator system of claim 1, wherein each capacitive element is a single-phase capacitor.

4. The generator system of claim 1, wherein each capacitive element is a bank of capacitors.

5. The generator system of claim 1, wherein the AC generator has a single phase.

6. The generator system of claim 1, wherein the AC generator has three phases.

7. The generator system of claim 1, wherein each capacitive element has a capacitance that is lower than a combined inductance of respective output and primary windings.

8. The generator system of claim 1, wherein the inductance of each output winding of the AC generator is higher than the inductance of a respective primary winding of the transformer.

9. A method of operating a generator system, the method comprising:
    conveying current between an output winding of each phase of an AC generator and a primary winding of a respective phase of a transformer via a respective series-connected capacitive element having a first terminal electrically connected to the output winding and a second terminal electrically connected to the primary winding.

10. The method of claim 9, further comprising:
    selecting a capacitance of each capacitive element to cause the generator system to resonate at about the same operating frequency as the AC generator.

11. A generator system comprising:
    an AC generator selected from one of a single phase generator and a poly phase generator;
    at least one capacitive element, wherein the number of capacitive elements being selected depending on the number of phases of the AC generator; and
    a transformer selected from one of a single-phase transformer and a poly phase transformer, the transformer being selected depending on the number of phases of the AC generator;
    wherein the at least one capacitive element has/have a first terminal electrically connected to a stator winding of the AC generator and has/have a second terminal electrically connected to a primary winding of the transformer.

* * * * *